(12) United States Patent
Izumi et al.

(10) Patent No.: US 12,109,660 B2
(45) Date of Patent: Oct. 8, 2024

(54) MACHINE TOOL AND MACHINE TOOL CONTROL SYSTEM

(71) Applicant: DMG MORI CO., LTD, Nara (JP)

(72) Inventors: Ryosuke Izumi, Nara (JP); Kenjiro Iga, Nara (JP)

(73) Assignee: DMG MORI CO., LTD., Nara (JP)

( * ) Notice: Subject to any disclaimer, the term of this patent is extended or adjusted under 35 U.S.C. 154(b) by 50 days.

(21) Appl. No.: 17/999,510

(22) PCT Filed: May 25, 2021

(86) PCT No.: PCT/JP2021/019865
§ 371 (c)(1),
(2) Date: Nov. 21, 2022

(87) PCT Pub. No.: WO2021/241597
PCT Pub. Date: Dec. 2, 2021

(65) Prior Publication Data
US 2023/0286096 A1 Sep. 14, 2023

(30) Foreign Application Priority Data
May 26, 2020 (JP) .................................. 2020-091785

(51) Int. Cl.
*B23Q 11/00* (2006.01)
*B23Q 11/08* (2006.01)
*B23Q 11/10* (2006.01)

(52) U.S. Cl.
CPC ...... *B23Q 11/0891* (2013.01); *B23Q 11/0078* (2013.01); *B23Q 11/08* (2013.01); *B23Q 11/10* (2013.01)

(58) Field of Classification Search
CPC . B23Q 11/0078; B23Q 11/08; B23Q 11/0891; B23Q 11/10; B23B 25/04
See application file for complete search history.

(56) References Cited

U.S. PATENT DOCUMENTS

| 9,669,505 B2 * | 6/2017 | Angel | B23Q 17/00 |
| 2022/0244698 A1 * | 8/2022 | Ono | B23Q 11/0082 |

FOREIGN PATENT DOCUMENTS

| CN | 104625861 A | * | 5/2015 | ............. | B23Q 11/00 |
| CN | 107081635 A | * | 8/2017 | ............. | B23Q 11/08 |

(Continued)

OTHER PUBLICATIONS

International Search Report, International Application No. PCT/JP2021/019865, dated Jul. 13, 2021, 11 pages.

(Continued)

*Primary Examiner* — Adam D Rogers
(74) *Attorney, Agent, or Firm* — Stinson LLP

(57) ABSTRACT

Disclosed is a machine tool including: a cover that encloses a processing space in which a workpiece is processed and has a window portion for visual inspection of the processing space from outside; a machining processing unit provided in the processing space; an operation panel for inputting instructions to the machining processing unit, the operation panel being provided outside of the cover; and a cooling system for cooling the machining processing unit, wherein the cooling system includes: a coolant supply unit for supplying a coolant into the processing space; a coolant protection unit that operates to limit adhesion of the coolant to the window portion; and a control unit that switches a state of the coolant protection unit based on a result of detection performed by a sensor for detecting an operator present around the cover. With this machine tool, waste of energy can be suppressed.

20 Claims, 7 Drawing Sheets

(56) References Cited

FOREIGN PATENT DOCUMENTS

| DE | 3621174 | A1 | * | 1/1987 | |
|---|---|---|---|---|---|
| DE | 10360283 | B3 | * | 4/2005 | ............... B08B 1/00 |
| DE | 102008045793 | A1 | * | 3/2010 | ............. B23Q 11/08 |
| DE | 202010007675 | U1 | * | 11/2010 | ............. B23Q 11/08 |
| DE | 102020123394 | A1 | * | 3/2022 | |
| EP | 3513933 | A | | 7/2019 | |
| JP | 1985031951 | U | | 3/1985 | |
| JP | H05287643 | A | | 11/1993 | |
| JP | 07266183 | A | | 10/1995 | |
| JP | 2016527091 | A | | 9/2016 | |
| JP | 2017019003 | A | | 1/2017 | |
| JP | 2018010366 | A | | 1/2018 | |
| JP | 2019025555 | A | | 2/2019 | |
| JP | 2019217603 | A | * | 12/2019 | |
| KR | 101939201 | B1 | | 1/2019 | |
| WO | 20150011126 | A1 | | 1/2015 | |

OTHER PUBLICATIONS

European Patent Office, Extended European Search Report, dated Jun. 10, 2024, EP Application No. 21811825.5, 5 pages.

* cited by examiner

MACHINE TOOL AND MACHINE TOOL CONTROL SYSTEM

REFERENCE TO RELATED APPLICATIONS

This application is a U.S. national stage application of International Patent Application No. PCT/JP2021/019865, filed May 25, 2021, which claims the benefit of Japanese Patent Application No. 2020-091785, filed May 26, 2020, the entire disclosures of which are incorporated herein by reference.

TECHNICAL FIELD

The present disclosure relates to a machine tool and a machine tool control system.

BACKGROUND ART

A large amount of friction heat is generated when a workpiece is processed by using a cutting tool. In general, a machine tool has the function of cooling a cutting tool with a coolant (a cutting fluid). Also, a machining processing unit included in the machine tool is enclosed by a cover so as to prevent shavings generated as a result of a workpiece being processed from being scattered into the surrounding environment. In the cover, a window portion is provided for an operator to visually check the progress of the processing operation. On the other hand, the coolant and the shavings are scattered to the window portion, which obstructs the visibility of the operator via the window portion.

To address this, Patent Literature 1 proposes a system that includes a machine tool window and an apparatus for clearing droplets of a cutting fluid from the machine tool window, wherein the apparatus includes: one or more transducers attached to the window, each being operable to generate ultrasonic waves in the window; and a generator for providing ultrasonic driving signals to the one or more transducers, and wherein during operation of the system, the droplets of the cutting fluid are ultrasonically cleared from the window.

CITATION LIST

Patent Literature

[PTL 1] Japanese Unexamined Patent Application Publication (Translation of PCT Application) No. 2016-527091

SUMMARY OF INVENTION

Technical Problem

In a system that includes an apparatus for clearing droplets of a cutting fluid from a machine tool window such as the system disclosed in Patent Literature 1, the apparatus for clearing the droplets of the cutting fluid from the window is constantly operating, and thus energy is consumed for the operation of the apparatus. However, as the automation of the workpiece processing operation that uses the machine tool advances, the frequency at which the operator visually checks the progress of the processing operation via the window portion decreases accordingly. Consequently, energy is wasted more than needed when the apparatus is constantly operating.

Solution to Problem

An aspect of the present disclosure relates to a machine tool including: a cover that encloses a processing space in which a workpiece is processed and has a window portion for visual inspection of the processing space from outside; a machining processing unit provided in the processing space; an operation panel for inputting instructions to the machining processing unit, the operation panel being provided outside of the cover; and a cooling system for cooling the machining processing unit, wherein the cooling system includes: a coolant supply unit for supplying a coolant into the processing space; a coolant protection unit that operates to limit adhesion of the coolant to the window portion; and a control unit that switches a state of the coolant protection unit based on a result of detection performed by a sensor for detecting an operator present around the cover.

Another aspect of the present disclosure relates to a machine tool control system including: a plurality of machine tools, each being the machine tool described above; and an image capturing apparatus for monitoring the plurality of machine tools, wherein the sensor detects the operator by using the image capturing apparatus.

Advantageous Effects of Invention

According to the present disclosure, it is possible to provide a machine tool that can suppress waste of energy, and a machine tool control system for controlling the machine tool.

Novel features of the present invention are set forth in the appended claims. However, the present invention will be well understood from the following detailed description of the present invention with reference to the drawings, in terms of both the configuration and the content together with other objects and features of the present invention.

DESCRIPTION OF EMBODIMENT

Figure 1:
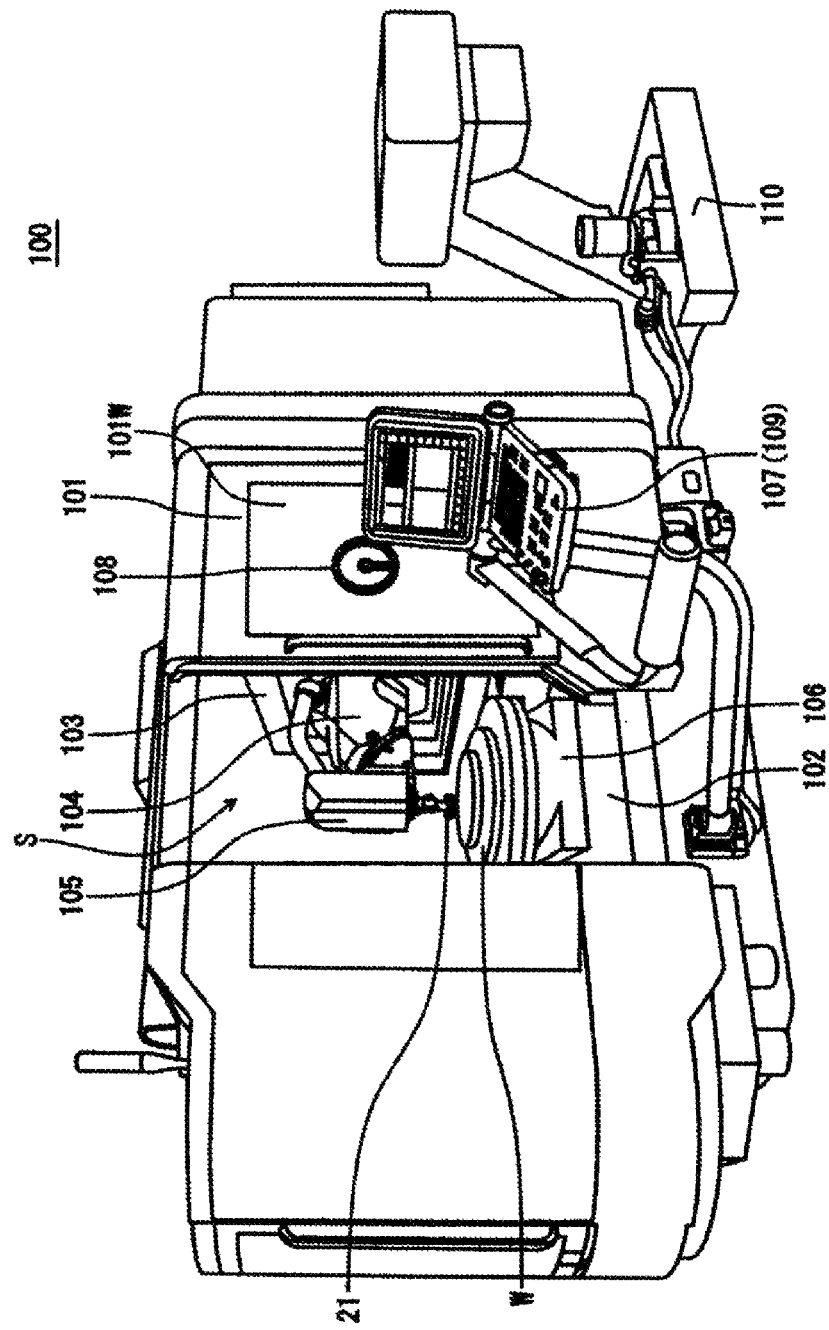
FIG. 1 is a perspective view showing a structure of an example of a machine tool according to an embodiment of the present disclosure.

A machine tool according to an embodiment of the present invention includes a cover, a machining processing unit, an operation panel, a cooling system, and the like. Examples of the machine tool include: a lathe; a vertical or horizontal machining center; a multi-processing machine that has a machining function that uses a fixed tool and a milling function that uses a rotary tool; a 5-axis processing machine that is controlled by using two or more rotary axes in addition to the X axis, the Y axis, and the Z axis; an additive manufacturing (AM) machine that can perform metal addition processing; and the like. However, the machine tool is not limited thereto.

The cover encloses a processing space in which a workpiece is processed, and has a window portion for visual inspection of the processing space from outside. The cover is also called a splash guard, and functions to cause shavings and a coolant to be confined within the processing space, the shavings being generated as a result of a workpiece being processed in the processing space. Normally, the cover includes a side wall and a ceiling wall that enclose the processing space. The cover may include a door that moves relative to the cover. For example, the door switches an opening formed in the cover between an open state and a closed state by being slid along the opening. In the open state, an operator can access the processing space, and in the closed state, the processing of a workpiece is performed. The window portion may be provided in the door of the cover.

The machining processing unit is a component essential for the machine tool provided in the processing space. The machining processing unit includes, for example, a worktable for fixing a workpiece, a spindle that is attached to a column, and a cutting tool (bite) that is fixed to the spindle. Alternatively, the machining processing unit may include a spindle table for fixing a workpiece and a tool rest for fixing a cutting tool for processing the workpiece.

The operation panel is an apparatus for inputting instructions to the machining processing unit, and is provided outside of the cover. The operation panel includes a CPU board, a main storage device, an auxiliary storage device, and the like. For convenience, the operation panel is provided, for example, in the vicinity of the opening of the cover or the door. The operation panel may be configured to perform overall control on the machine tool that includes the machining processing unit.

The cooling system is a system for cooling the workpiece and the cutting tool, and includes a coolant supply unit for supplying a coolant into the processing space, a coolant protection unit that operates to limit adhesion of the coolant to the window portion, and a control unit (hereinafter referred to as a "visibility control unit") that switches the state of the coolant protection unit based on the result of detection performed by a sensor (hereinafter referred to as an "operator sensor") for detecting an operator present around the cover. The operator sensor may be included in the machine tool, or may be disposed outside of the machine tool.

By cooperation between the coolant protection unit, the operator sensor, and the visibility control unit, it is possible to cause the operator to constantly achieve a clear visual inspection of the processing space via the window portion, and suppress waste of energy. Even in the case where, for example, the factory becomes more automated, and the frequency at which the operator visually checks the progress of the processing operation via the window portion decreases, the coolant protection unit can operate at the minimum energy required, and thus energy is not wasted more than needed.

For example, the coolant supply unit includes a nozzle for spraying a large amount of a liquid coolant toward the workpiece and the cutting tool. The coolant that has been sprayed to the workpiece and the cutting tool is recovered by a predetermined recovery unit, and separated from the shavings so as to be reused. As other examples, the following configurations are also possible: a configuration in which the coolant is sprayed from a tool tip end after passing through the spindle; a configuration in which the coolant is sprayed from the ceiling to wash away the shavings in the processing space; and the like.

The coolant protection unit is not particularly limited as long as it is possible to operate to limit adhesion of the coolant to the window portion. Examples of the coolant protection unit include: an air spray apparatus for spraying air toward the window portion; a rotary window (clear view screen) for shaking off the coolant adhering to the window portion by the centrifugal force; and the like. Any of these coolant protection units consumes energy, such as power, to perform operations, and it is therefore desired that an operating state and a dormant state are efficiently repeated. However, according to conventional technology, it has only been possible to constantly continue the operating state, wasting a large amount of energy.

The operator sensor may be any sensor as long as it is possible to detect the operator present around the cover, and the configuration of the operator sensor is not particularly limited. For example, the waste of energy can be suppressed by the visibility control unit selectively causing the coolant protection unit to operate only when the operator sensor has detected the presence of the operator around the cover. For example, the presence of the operator may be detected in a non-contact manner by using, but not limited to, an infrared sensor, an optical sensor, an image recognition camera, or the like. For example, an image recognition camera of a superordinate system that manages a plurality of machine tools may be used.

The visibility control unit may be configured by using, for example, the CPU board, the main storage device, the auxiliary storage device, and the like that are included in the operation panel, or by using a control unit of a superordinate management unit that manages a plurality of machine tools.

Next, an overview of controlling the visibility control unit included in the cooling system will be described.

The visibility control unit issues, for example, an instruction to bring the coolant protection unit into a second state when the operator sensor has not detected the operator, and issues an instruction to bring the coolant protection unit into a first state when the operator sensor has detected the operator. The first state is a state in which the coolant protection unit operates, and the second state is a dormant state in which the coolant protection unit does not operate, or a state in which the coolant protection unit operates at an output lower than that in the first state. When the operator sensor has not detected the operator, there is no possibility that the operator performs a visual inspection of the processing space via the window portion, and thus the coolant protection unit may be in the dormant state. When the coolant protection unit operates at an output lower than that in the first state, the window portion does not become too dirty, and thus the window portion can be rapidly cleaned at a timing when the coolant protection unit is brought into the first state. While the coolant protection unit is operating at the lower output in the second state, the window portion does not need to be cleaned to such a degree that a visual inspection via the window portion can be performed. As used herein, the term "output" refers to power (W). That is, the power of the coolant protection unit in the second state is sufficiently smaller than the power of the coolant protection unit in the first state.

The first state may be selected from among a plurality of output states. For example, the visibility control unit may select one from among the plurality of output states based on the duration of the most recent second state. For example, when the duration of the most recent second state is long, by causing the coolant protection unit to operate in a higher output state, the coolant and the shavings adhering to the window portion during the period in which the coolant protection unit is in the second state can be rapidly removed to instantly clear the visibility. On the other hand, when the duration of the most recent second state is short, the amount of the coolant and the shavings adhering to the window portion during the period in which the coolant protection unit is in the second state is small, and thus the coolant protection unit may be caused to operate at a lower output. With this configuration, the waste of energy can be effectively suppressed. The number of output states from which the first state can be selected may be two, or may be three or more. For example, the first state may be selected from among two states including a normal output state and a high output state in which the output is higher than that in the normal output state. Furthermore, any one of a plurality of high output states with different outputs may be selected.

The visibility control unit may control the coolant protection unit to decrease or increase the output in the first state based on the duration of the first state. For example, at an early stage immediately after the coolant protection unit has been switched from the second state to the first state, the coolant and the shavings adhering to the window portion may be removed in the high output state, and thereafter, the state may be switched to the normal output state. In this case, for example, when the operator performs a visual inspection operation, the operator can soon smoothly have good visibility.

On the other hand, when the duration of the first state is longer than a predetermined length of time, the visibility control unit automatically switches the output state of the coolant protection unit to a higher output state. With this configuration, the operator can automatically have clearer visibility without having to perform an operation.

The visibility control unit may be switchable between a first mode and a second mode. Here, the first mode is a mode in which the visibility control unit switches the state of the coolant protection unit based on the result of detection performed by the sensor. The second mode is a mode in which the state of the coolant protection unit can be manually switched. With this configuration, the machine tool can be operated flexibly according to the situation.

The operator sensor may detect the operator based on an intended operation of the operator. The intended operation may be, for example, an operation performed around the operation panel or the window portion by the operator.

The operation performed around the operation panel by the operator is typically an operation of the operation panel performed by the operator. In this case, the operator sensor may detect an operation signal of the operation panel. Alternatively, the intended operation of the operator (the operation of the operation panel) may be detected by using, for example, a pressure sensitive sensor or the like when the operator touches the operation panel.

The operation performed around the window portion by the operator may be a visual inspection operation of visually inspecting the processing space via the window portion performed by the operator. For this visual inspection operation, the operator needs to bring his/her face very close to the window portion. Accordingly, the operator sensor may detect the action of the operator approaching the window portion as the visual inspection operation. Such detection may be performed by using an infrared sensor or the like that is provided in the vicinity of the window portion outside of the cover, but the action of the operator approaching the window portion may be detected by using an image capturing apparatus (hereinafter referred to as a "first image capturing apparatus") that is installed in the processing space.

As the first image capturing apparatus, for example, one or more image capturing apparatuses may be provided in the processing space for the purposes of monitoring the processing state of the workpiece, monitoring the accumulated state of the shavings, measuring the dimensions of the processed workpiece, detecting an abnormal state, and the like. By using the first image capturing apparatus, the need for providing a dedicated operator sensor for a cooling system can be eliminated. Also, the first image capturing apparatus installed in the processing space is not sensitive to most of the operations performed by the operator outside of the cover, and detects the visual inspection operation only when the operator has brought his/her face very close to the window portion, and thus a malfunction of the coolant protection unit is suppressed. That is, it is possible to detect the visual inspection operation of visually inspecting the processing space via the window portion performed by the operator with high accuracy while suppressing an increase in cost.

Next, the present invention encompasses a machine tool control system. Normally, in a factory equipped with a plurality of machine tools, a superordinate management unit that manages the plurality of machine tools is provided. The superordinate management unit directs, for example, preparation of an operation schedule of operations performed in the factory, execution of the operation schedule, and the like. Normally, the superordinate management unit includes at least one image capturing apparatus (hereinafter referred to as a "second image capturing apparatus") for monitoring the operation status of the plurality of machine tools, and the like. The second image capturing apparatus may also function as the operator sensor. For example, the second image capturing apparatus detects an intended operation of the operator based on images, and transmits the result of detection to the visibility control unit. The visibility control unit may be included in the superordinate management unit, or may be included in each machine tool. In the case where the visibility control unit is included in each machine tool, necessary instructions are transmitted from the superordinate management unit to the visibility control units included in the machine tools.

Hereinafter, the machine tool and the machine tool control system according to the present invention will be described with reference to the accompanying drawings. The terms indicating directions (for example, "X axis", "Y axis", "Z axis", and the like) will be used as appropriate in the description of the following embodiment. However, these terms are used to describe the present invention, and thus are not intended to limit the scope of the present invention. In addition, in the diagrams, the shapes and the dimensions of the structural components of the machine tool are not necessarily true to scale. Also, in the diagrams, structural components that are the same are given the same reference numerals.

Figure 2:
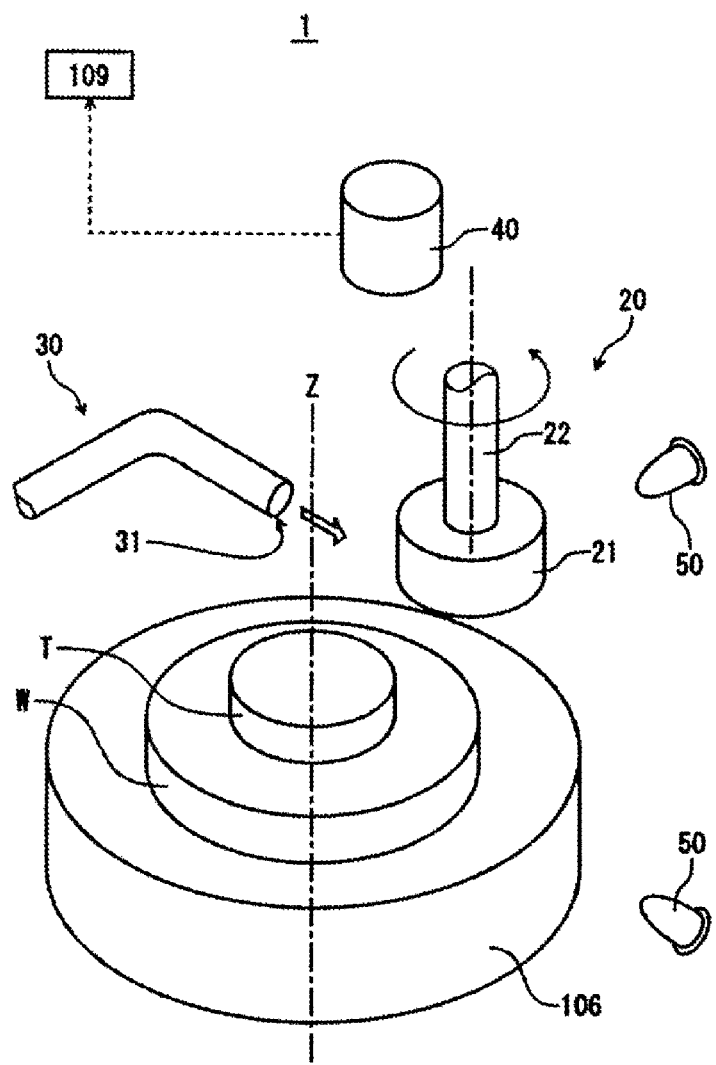
FIG. 2 is a schematic perspective view of a configuration of a processing space in the machine tool.
Figure 3:
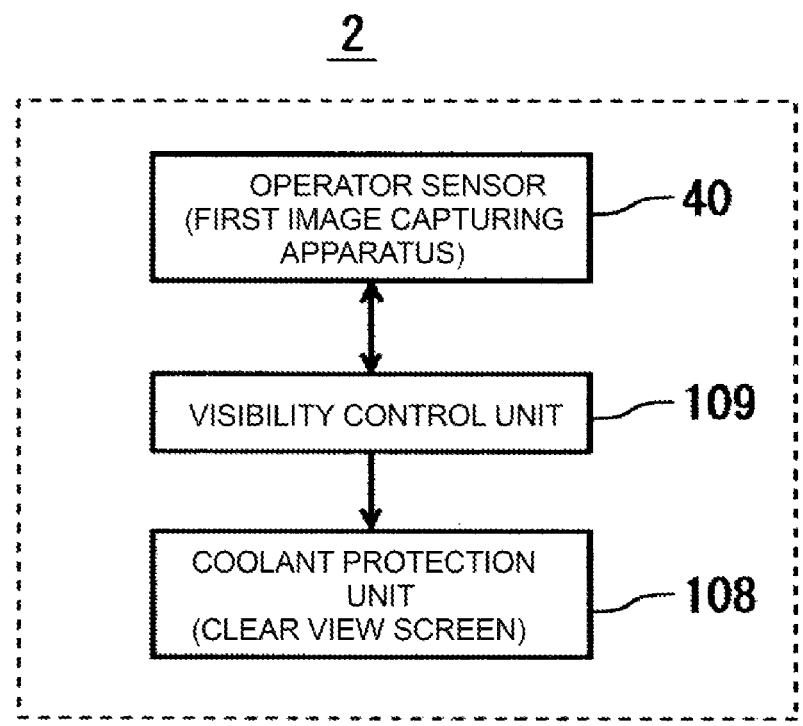
FIG. 3 is a block diagram showing a configuration of a cooling system included in the machine tool.
Figure 4:
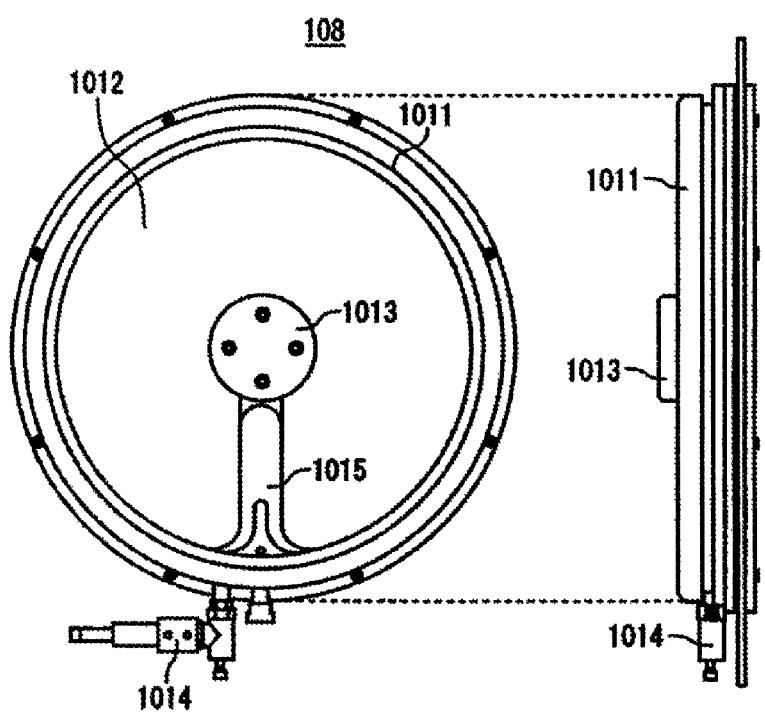
FIG. 4 is a configuration diagram showing an example of a coolant protection unit.

FIG. 1 is a schematic perspective view showing an overall configuration of a machine tool 100 according to an embodiment of the present invention. FIG. 2 is a schematic perspective view of a processing space S in the machine tool 100. FIG. 3 is a block diagram showing a schematic configuration of a cooling system 2. FIG. 4 is a configuration diagram showing an example of a coolant protection unit.

As shown in FIG. 1, the machine tool 100 is installed directly on the floor of a factory or the like. The machine tool 100 includes: a cover 101 that encloses the processing space S where a workpiece W is processed and has a window portion 101W for visual inspection of the processing space S from outside; a bed 102 that is disposed in the processing space S enclosed by the cover 101; a column 103 that extends in the Z direction (upward in FIG. 1) from the bed 102; a saddle 104 that extends in the X direction (leftward in FIG. 1) from the column 103; a spindle head 105 that is fixed to the saddle 104; a cutting tool 21 that is removably attached to the spindle head 105; and a table 106 that fixes and supports the workpiece W that is an object to be processed. The bed 102, the column 103, the saddle 104, the spindle head 105, the cutting tool 21, and the table 106 constitute a machining processing unit 1.

The machine tool 100 can perform perforation processing, polishing processing, or the like on the workpiece W placed on the table 106 by attaching, instead of the cutting tool 21, an appropriate processing tool such as a perforation tool (a drill) or a polishing tool (a grindstone). The machine tool 100 may be, for example, a 5-axis multi-processing machine that can process multiple sides of a workpiece W with one chucking by controlling the X axis, the Y axis, the Z axis, the rotation axis, and the tilting axis.

Also, the machine tool 100 includes: a coolant supply unit 30 for supplying a coolant into the processing space S (see FIG. 2); an operation panel 107 for inputting instructions to the machining processing unit 1 that is provided outside of the cover 101; a coolant protection unit 108 that operates to limit adhesion of the coolant to the window portion 101W; a first image capturing apparatus 40, such as a CCD camera, that also functions as an operator sensor for detecting an operator; and a visibility control unit 109 that switches the state of the coolant protection unit 108 based on the result of detection performed by the first image capturing apparatus 40. The coolant protection unit 108 is configured as a clear view screen that is provided in the window portion 101W of the cover 101, and the clear view screen itself functions as the coolant protection unit 108. The first image capturing apparatus 40 also has the function of monitoring the workpiece W being processed, the cutting tool 21, and the background thereof. Here, the visibility control unit 109 is configured by using a CPU board, a main storage device, an auxiliary storage device, and the like that are included in the operation panel 107.

The coolant supply unit 30, the coolant protection unit (clear view screen) 108 that is provided in the window portion 101W, the first image capturing apparatus 40 that also functions as the operator sensor, the visibility control unit 109 that is included in the operation panel 107 constitute a cooling system 2. The coolant that has been sprayed to the workpiece W and the cutting tool 21 is recovered by a coolant recovery unit 110, and separated from the shavings so as to be reused.

In FIGS. 1 and 2, the workpiece W is fixed to the table 106 and includes a circular protruding portion T about the Z axis. In the processing space S, a driving unit 20 for driving the cutting tool 21 to rotate, and a plurality of illumination units 50 for illuminating the workpiece W being processed, such as LEDs, are provided. The cutting tool 21 is attached to the spindle head 105 via a driving rod 22 and configured to rotate about a central axis that is parallel to the Z axis. As a result of the rotating cutting tool 21 being brought into contact with a vertical surface (a side surface extending in the Z axis direction) of the protruding portion T of the workpiece W, the protruding portion T of the workpiece W is shaved to have a desired radius. Note that the processing method performed by the machine tool 100 is not intended to limit the scope of the present invention. Likewise, the shape into which the workpiece W is processed is not limited to the simple shape described above, and the present invention is applicable to, for example, various shapes and processes implemented by the 5-axis multi-processing machine.

During processing performed in the machine tool 100, the cutting tool 21 is brought into contact with the protruding portion T of the workpiece W while the cutting tool 21 is rotated about the Z axis by a motor (the driving unit 20) that is disposed in the spindle head 105, and at the same time, a large amount of a coolant is sprayed from a nozzle 31 of the coolant supply unit 30 toward the workpiece W and the cutting tool 21 to cool the workpiece W and the cutting tool 21. The coolant that has been sprayed from the nozzle 31 collides with the workpiece W and the cutting tool 21 and is scattered and formed into droplets. The scattered matter generated while the workpiece is being processed includes, in addition to the droplets of the coolant, a large amount of shavings generated from the workpiece being processed. The scattered matter normally adheres to the window portion 101W for visual inspection of the processing space.

The first image capturing apparatus 40 also functions as an operator sensor for detecting a visual inspection operation of visually inspecting the processing space via the clear view screen provided in the window portion 101W performed by the operator (or in other words, an action of the operator approaching the window portion). The result of detection is transmitted to the visibility control unit 109, and the visibility control unit 109 selects the state of the coolant protection unit 108 (clear view screen) based on the result of detection, and switches the state of the coolant protection unit 108 where necessary.

In FIG. 4, the coolant protection unit 108 includes: an annular frame 1011; an in-frame window portion 1012 that rotates within the annular frame 1011; a central driving unit (motor) 1013 that is disposed at the center of the in-frame window portion 1012 and causes the in-frame window portion 1012 to rotate; and an air nozzle 1014 for blowing air into a gap between the annular frame 1011 and the in-frame window portion 1012. The central driving unit 1013 is supported by a bridge portion 1015 that is connected to the annular frame 1011 and also has the function of fixing the in-frame window portion 1012 to the center of the annular frame 1011. With the clear view screen, the in-frame window portion 1012 is rotated at a high speed to limit the adhesion of the coolant to the in-frame window portion 1012 itself by the centrifugal force. The operator can always have clear visibility because the coolant protection unit 108 is rotated at a high speed at a timing when a visual inspection by the operator is needed, while saving the energy for driving the coolant protection unit 108 by configuring the visibility control unit 109 to switch the state of the coolant protection unit 108.

Figure 5:
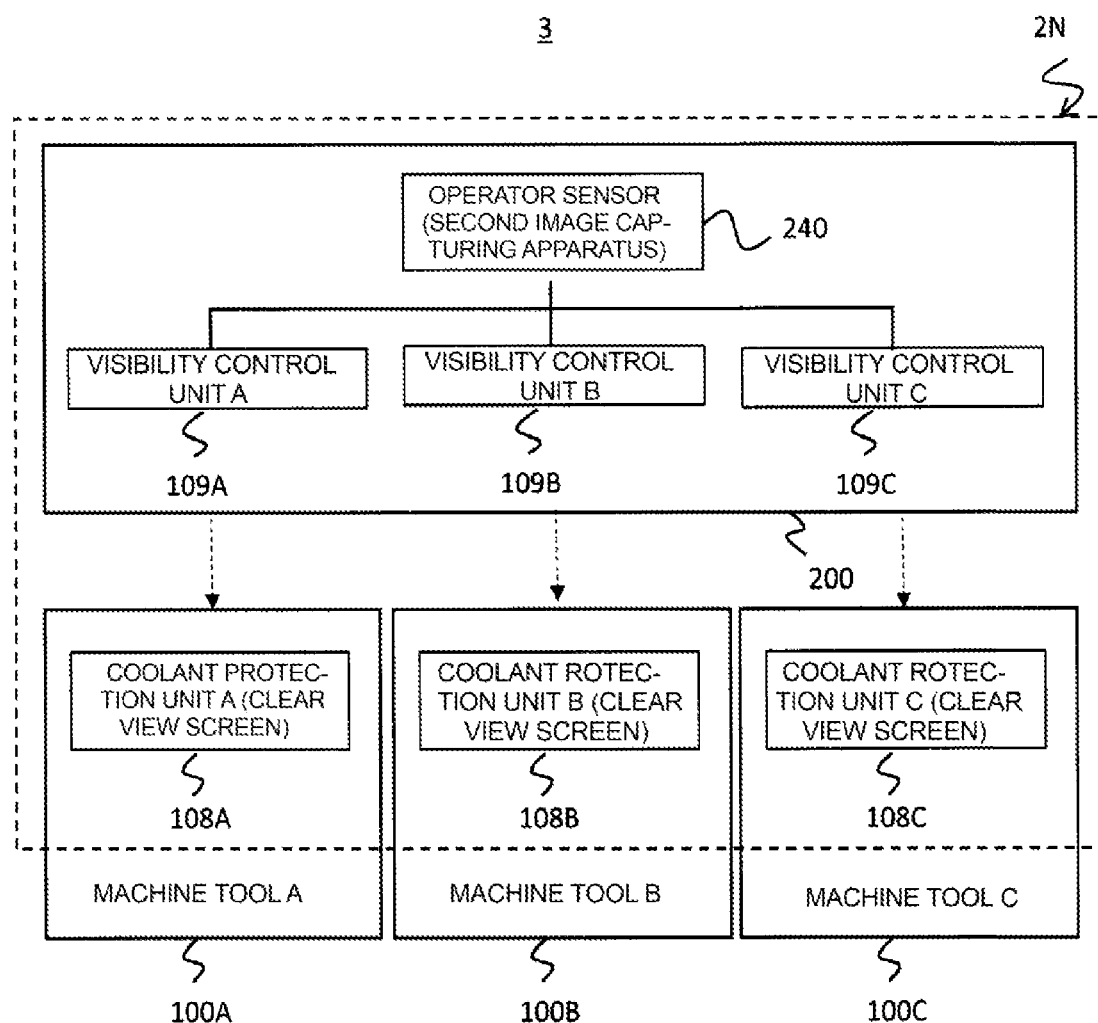
FIG. 5 is a block diagram showing a schematic configuration of a machine tool control system for controlling a plurality of machine tools.

Next, a machine tool control system for controlling a plurality of machine tools will be described. FIG. 5 is a block diagram showing a schematic configuration of a machine tool control system 3 for controlling a plurality of machine tools. The control system 3 includes a plurality of machine tools A to C (100A, 100B, and 100C (hereinafter, N will be used when it is necessary to collectively refer to A, B, and C) and a superordinate management unit 200 that manages the plurality of machine tools 100N. The superordinate management unit 200 includes a second image capturing apparatus 240 for monitoring the state of the plurality of machine tools 100N. In this case, the second image capturing apparatus 240 can also function as the operator sensor, and the second image capturing apparatus 240 detects an intended operation of the operator. The superordinate management unit 200 includes visibility control units 109A, 109B, and 109C (109N) for the plurality of machine tools 100N, and constitutes a portion of a cooling system 2N for cooling the plurality of machine tools 100N. The visibility control units 109N control coolant protection units 108A, 108B, and 108C (108N) of the corresponding machine tools based on the results of detection. The same control as that performed by the cooling system 2 of the machine tool is performed. The number of machine tools included in the control system 3 is not particularly limited. Also, the number of second image capturing apparatuses 240 is not limited to one, and may be more.

Figure 6:
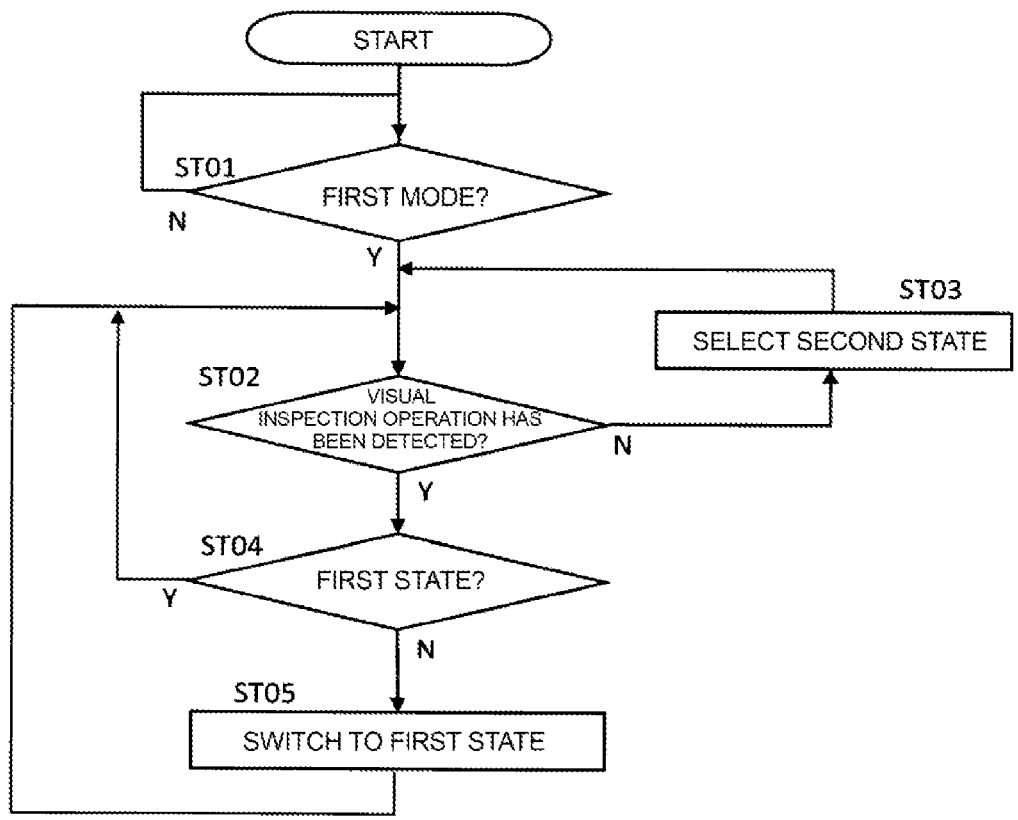
FIG. 6 is a flow diagram showing an example of controlling the coolant protection unit.

Next, a specific example of control performed by the visibility control unit 109 of the cooling system 2 will be described. FIG. 6 is a flow diagram showing an example (a first aspect) of controlling the coolant protection unit 108. Here, an example will be described in which the visibility control unit 109 is switchable between a first mode and a second mode. In the first mode, the visibility control unit 109 automatically switches the state of the coolant protection unit 108 between a first state and a second state based on the result of detection performed by an operator sensor (the first image capturing apparatus 40 or the second image capturing apparatus 240). On the other hand, in the second mode, the operator can manually switch the state of the coolant protection unit 108, and the visibility control unit 109 does not automatically operate. The first state is a state in which the coolant protection unit 108 operates, and the second state is a dormant state in which the coolant protection unit 108 does not operate or an idle state in which the coolant protection unit 108 operates at an output sufficiently lower than that in the first state.

First, the visibility control unit 109 determines whether or not the visibility control unit 109 is in the first mode (ST01). If it is determined that the visibility control unit 109 is not in the first mode (N), the visibility control unit 109 is in the second mode, and thus the control ends here. On the other hand, if it is determined that the visibility control unit 109 is in the first mode (Y), the visibility control unit 109 determines whether or not the operator sensor has detected a visual inspection operation of the operator (ST02). If it is determined that the operator sensor has not detected a visual inspection operation of the operator (N), the visibility control unit 109 selects the second state to keep the coolant protection unit 108 in the dormant state or the idle state (ST03). On the other hand, if it is determined that the operator sensor has detected a visual inspection operation of the operator (Y), the visibility control unit 109 determines whether the coolant protection unit 108 is in the first state at this time (ST04). If it is determined that the coolant protection unit 108 is already operating in the first state (Y), the flow returns to ST02, and the same control is repeated. On the other hand, if it is determined that the coolant protection unit 108 is not in the first state (N), the coolant protection unit 108 is in the second state at this time, and thus the visibility control unit 109 switches the state of the coolant protection unit 108 to the first state to cause the coolant protection unit 108 to operate (ST05). After that, the flow returns to ST02, and the same control is repeated.

Figure 7:
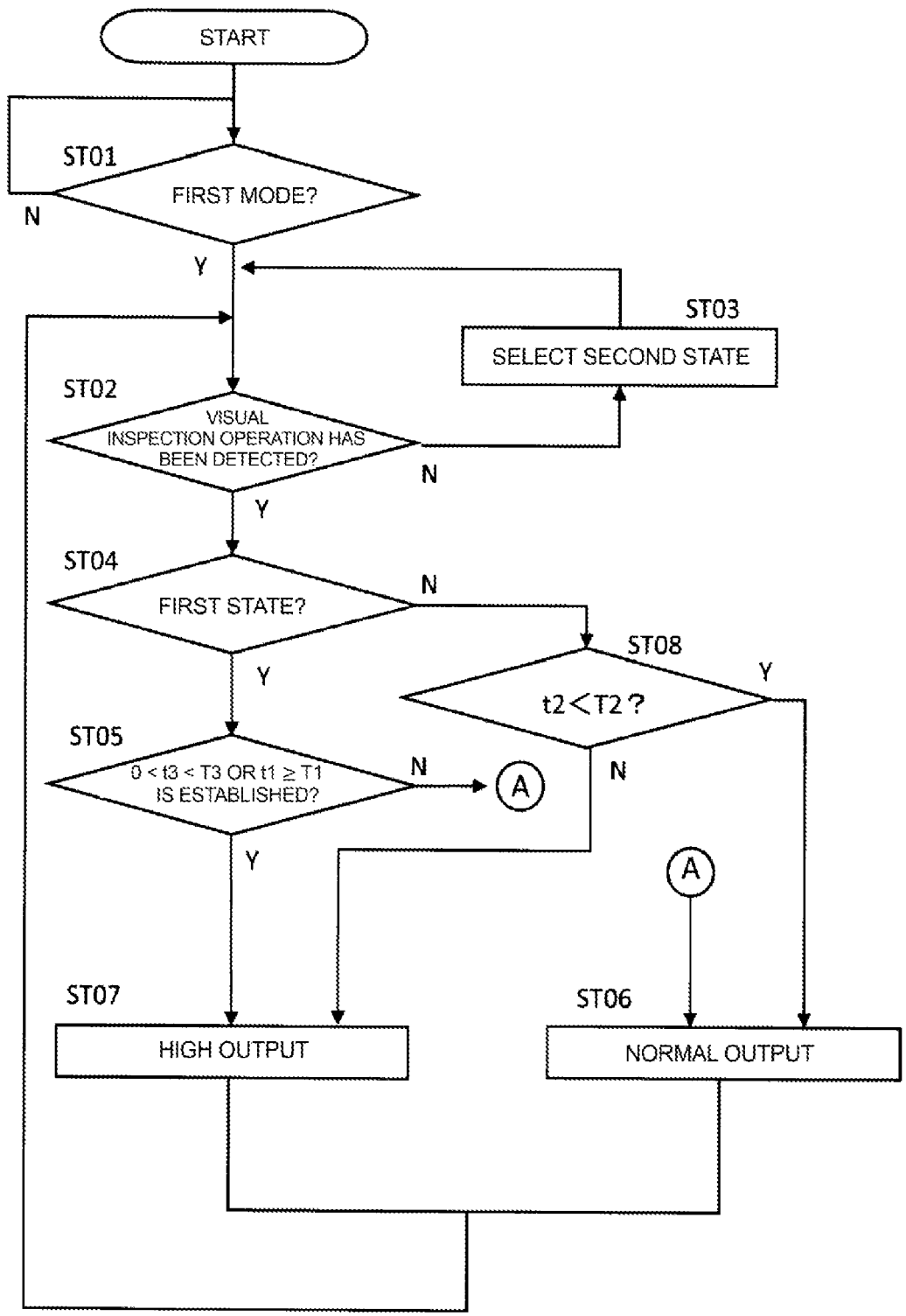
FIG. 7 is a flow diagram showing another example of controlling the coolant protection unit.

FIG. 7 is a flow diagram showing another example (a second aspect) of controlling the coolant protection unit 108. Here, an example will be described in which either a first output (normal output) or a second output (high output) that is sufficiently higher than the first output is selected as the output in the first state by determining whether or not duration t1 of the first state is shorter than predetermined length of time T1 or by determining whether or not duration t2 of the most recent second state is shorter than predetermined length of time T2.

In the control according to the second aspect performed by the visibility control unit 109, the processing operations from ST01 to ST04 are the same as those of the first aspect. If it is determined in ST04 that the coolant protection unit 108 is in the first state (Y), the visibility control unit 109 determines whether or not duration t1 of the first state is greater than or equal to predetermined length of time T1 (or in other words, whether t1≥T1 is established) (ST05). If it is determined that t1≥T1 is not established (t1<T1 is established) (N), from which it is estimated that the visual inspection operation is smoothly performed by the operator in a short period of time, and thus the visibility control unit 109 causes the coolant protection unit 108 to operate at a normal output (ST06). After that, the flow returns to ST02, and the same control is repeated.

On the other hand, if it is determined that t1≥T1 is established (Y), from which it can be seen that the visual inspection operation performed by the operator is continued over a relatively long period of time, and it is therefore estimated that the visibility via the window portion still remains poor or that the operator is forced to carefully check the progress of the operation. In this case, the visibility control unit 109 causes the coolant protection unit 108 to operate at a high output (ST07). After that, the flow returns to ST02, and the same control is performed.

If it is determined in ST04 that the coolant protection unit 108 is not in the first state (N), the visibility control unit 109 is in the second state. In this case, whether or not duration t2 of the most recent second state is shorter than predetermined length of time T2 (or in other words, t2<T2 is established) is determined (ST08). If it is determined that t2<T2 is established (Y), from which it is estimated that the window portion is less dirty, and thus the visibility control unit 109 causes the coolant protection unit 108 to operate at a normal output (ST06). After that, the flow returns to ST02, and the same control is repeated. On the other hand, if it is determined that t2≥T2 is established (N), from which it is estimated that the window portion is very dirty, and thus the visibility control unit 109 causes the coolant protection unit 108 to operate at a high output (ST07). After that, the flow returns to ST02, and the same control is repeated to ST04. Next, in ST05, whether or not operation time t3 during which the coolant protection unit 108 operates at a high output is shorter than predetermined length of time T3 (or in other words, 0<t3<T3 is established) is determined. If it is determined that 0<t3<T3 is established (Y), the visibility control unit 109 continues to cause the coolant protection unit 108 to operate at a high output (ST07). On the other hand, if it is determined that t3≥T3 is established (N), the visibility control unit 109 causes the coolant protection unit 108 to operate at a normal output (ST06). After that, the flow returns to ST02, and the same control is repeated.

As described above, in ST05, whether t1≥T1 is established is determined, and whether 0<t3<T3 is established is also determined in parallel. If it is determined that either one of t1≥T1 and 0<t3<T3 is satisfied, the coolant protection unit 108 operates at a high output. That is, if it is determined that 0<t3<T3 is established, even when t1<T1, the coolant protection unit 108 operates at a high output. Also, if it is determined that t1≥T1 is established, even when t3≥T3, the coolant protection unit 108 operates at a high output. When t2<T2 is established, t3=0 is obtained.

The embodiment disclosed herein is exemplary in all aspects, and thus should not be construed as limiting. The scope of the invention of the present application is indicated by the appended claims rather than the foregoing description, and all changes that come within the meaning and range of equivalency of the claims are intended to be embraced within the scope of the invention of the present application.

INDUSTRIAL APPLICABILITY

The present invention is applicable to a machine tool that includes a cooling system, and a machine tool control system for controlling the machine tool.

REFERENCE SIGNS LIST 1 machining processing unit
2 cooling system
3 control system
20 driving unit
21 cutting tool
22 driving rod
30 coolant supply unit
31 nozzle
40 (240) image capturing apparatus
50 illumination unit
100 machine tool
101 cover
101W window portion
1011 annular frame
1012 in-frame window portion
1013 central driving unit (motor)
1014 air nozzle
1015 bridge portion
102 bed
103 column
104 saddle
105 spindle head
106 table
107 operation panel
108 coolant protection unit (clear view screen)
109 visibility control unit
110 coolant recovery unit
W workpiece (object to be processed)
S processing space

The invention claimed is:

1. A machine tool comprising:
a cover that encloses a processing space in which a workpiece is processed and has a window portion for visual inspection of the processing space from outside;
a machining processing unit provided in the processing space;
an operation panel for inputting instructions to the machining processing unit, the operation panel being provided outside of the cover; and
a cooling system for cooling the machining processing unit,
wherein the cooling system includes:
a coolant supply unit for supplying a coolant into the processing space;
a coolant protection unit that operates to limit adhesion of the coolant to the window portion; and
a control unit that switches a state of the coolant protection unit based on a result of detection performed by a sensor for detecting an operator present around the cover,
wherein the control unit is switchable between a first mode and a second mode, in the first mode, the control unit switches the state of the coolant protection unit based on the result of detection performed by the sensor, and
in the second mode, the state of the coolant protection unit can be manually switched.

2. The machine tool in accordance with claim 1,
wherein the control unit brings the coolant protection unit into a first state when the sensor has detected the operator, and brings the coolant protection unit into a second state when the sensor has not detected the operator,
the first state is a state in which the coolant protection unit operates, and
the second state is a dormant state in which the coolant protection unit does not operate or a state in which the coolant protection unit operates at an output lower than that in the first state.

3. The machine tool in accordance with claim 2,
wherein the first state is selected from among a plurality of output states, and
the control unit selects one from among the plurality of output states based on a duration of the most recent second state.

4. The machine tool in accordance with claim 2,
wherein the control unit decreases or increases the output in the first state based on a duration of the first state.

5. The machine tool in accordance with claim 1,
wherein the sensor detects the operator based on an intended operation of the operator.

6. A machine tool control system comprising:
a plurality of machine tools, each being the machine tool in accordance with claim 1; and
an image capturing apparatus for monitoring the plurality of machine tools,
wherein the sensor is the image capturing apparatus and detects the operator.

7. A machine tool comprising:
a cover that encloses a processing space in which a workpiece is processed and has a window portion for visual inspection of the processing space from outside;
a machining processing unit provided in the processing space;
an operation panel for inputting instructions to the machining processing unit, the operation panel being provided outside of the cover; and
a cooling system for cooling the machining processing unit,
wherein the cooling system includes:
a coolant supply unit for supplying a coolant into the processing space;
a coolant protection unit that operates to limit adhesion of the coolant to the window portion; and
a control unit that switches a state of the coolant protection unit based on a result of detection performed by a sensor for detecting an operator present around the cover,
wherein the control unit brings the coolant protection unit into a first state when the sensor has detected the operator, and brings the coolant protection unit into a second state when the sensor has not detected the operator,
the first state is a state in which the coolant protection unit operates,
the second state is a dormant state in which the coolant protection unit does not operate or a state in which the coolant protection unit operates at an output lower than that in the first state, and the control unit decreases or increases the output in the first state based on a duration of the first state.

8. The machine tool in accordance with claim 7,
wherein the first state is selected from among a plurality of output states, and
the control unit selects one from among the plurality of output states based on a duration of the most recent second state.

9. The machine tool in accordance with claim 7,
wherein the control unit is switchable between a first mode and a second mode,
in the first mode, the control unit switches the state of the coolant protection unit based on the result of detection performed by the sensor, and
in the second mode, the state of the coolant protection unit can be manually switched.

10. The machine tool in accordance with claim 7,
wherein the sensor detects the operator based on an intended operation of the operator.

11. A machine tool control system comprising:
a plurality of machine tools, each being the machine tool in accordance with claim 7; and
an image capturing apparatus for monitoring the plurality of machine tools,
wherein the sensor is the image capturing apparatus and detects the operator.

12. A machine tool comprising:
a cover that encloses a processing space in which a workpiece is processed and has a window portion for visual inspection of the processing space from outside;
a machining processing unit provided in the processing space;
an operation panel for inputting instructions to the machining processing unit, the operation panel being provided outside of the cover; and
a cooling system for cooling the machining processing unit,
wherein the cooling system includes:
a coolant supply unit for supplying a coolant into the processing space;
a coolant protection unit that operates to limit adhesion of the coolant to the window portion; and
a control unit that switches a state of the coolant protection unit based on a result of detection performed by a sensor for detecting an operator present around the cover,
wherein the control unit brings the coolant protection unit into a first state when the sensor has detected the operator, and brings the coolant protection unit into a second state when the sensor has not detected the operator,
the first state is a state in which the coolant protection unit operates,
the second state is a dormant state in which the coolant protection unit does not operate or a state in which the coolant protection unit operates at an output lower than that in the first state,
the first state is selected from among a plurality of output states, and
the control unit selects one from among the plurality of output states based on a duration of the most recent second state.

13. The machine tool in accordance with claim 12,
wherein the control unit decreases or increases the output in the first state based on a duration of the first state.

14. The machine tool in accordance with claim 12,
wherein the control unit is switchable between a first mode and a second mode,
in the first mode, the control unit switches the state of the coolant protection unit based on the result of detection performed by the sensor, and
in the second mode, the state of the coolant protection unit can be manually switched.

15. The machine tool in accordance with claim 12,
wherein the sensor detects the operator based on an intended operation of the operator.

16. The machine tool in accordance with claim 15,
wherein the intended operation is an operation performed around the operation panel or the window portion by the operator.

17. The machine tool in accordance with claim 15,
wherein the intended operation is a visual inspection operation of visually inspecting the processing space via the window portion performed by the operator.

18. The machine tool in accordance with claim 17,
wherein the sensor detects an action of the operator approaching the window portion as the visual inspection operation.

19. The machine tool in accordance with claim 18,
wherein the sensor is an image capturing apparatus that is installed in the processing space, and detects the action of the operator approaching the window portion.

20. A machine tool control system comprising:
a plurality of machine tools, each being the machine tool in accordance with claim 12; and
an image capturing apparatus for monitoring the plurality of machine tools,
wherein the sensor is the image capturing apparatus and detects the operator.

\* \* \* \* \*